US006624853B1

(12) United States Patent
Latypov

(10) Patent No.: US 6,624,853 B1
(45) Date of Patent: Sep. 23, 2003

(54) METHOD AND SYSTEM FOR CREATING VIDEO PROGRAMS WITH INTERACTION OF AN ACTOR WITH OBJECTS OF A VIRTUAL SPACE AND THE OBJECTS TO ONE ANOTHER

(76) Inventor: Nurakhmed Nurislamovich Latypov, 5 Voikovsky proezd, d.10,kv.31, Moscow (RU)

( * ) Notice: Subject to any disclaimer, the term of this patent is extended or adjusted under 35 U.S.C. 154(b) by 0 days.

(21) Appl. No.: 09/646,552
(22) PCT Filed: Mar. 18, 1999
(86) PCT No.: PCT/RU99/00121
 § 371 (c)(1),
 (2), (4) Date: Sep. 19, 2000
(87) PCT Pub. No.: WO99/49648
 PCT Pub. Date: Sep. 30, 1999

(30) Foreign Application Priority Data

Mar. 20, 1998 (RU) ............................................. 98105829

(51) Int. Cl.[7] ............................................... H04N 5/222
(52) U.S. Cl. ......................... 348/722; 348/584; 348/587
(58) Field of Search ................................. 348/722, 584, 348/588, 578, 587, 383, 36, 39, 207.1, 207.11, 211.3; 345/423, 419, 420

(56) References Cited

U.S. PATENT DOCUMENTS

| 5,495,576 A | * | 2/1996 | Ritchey ..................... 395/125 |
| 5,850,352 A | * | 12/1998 | Moezzi et al. ............... 348/113 |
| 5,930,740 A | * | 7/1999 | Mathisen .................... 702/152 |
| 6,020,931 A | * | 2/2000 | Bilbrey et al. .............. 348/584 |
| 6,040,841 A | * | 3/2000 | Cohen et al. ................ 345/473 |
| 6,084,590 A | * | 7/2000 | Robotham et al. ........... 345/419 |
| 6,304,298 B1 | * | 10/2001 | Steinberg et al. ............ 348/587 |

FOREIGN PATENT DOCUMENTS

| RU | 94007630 A1 | 10/1995 |
| RU | 94001424 A1 | 2/1996 |
| SU | 1412001 A1 | 7/1988 |
| WO | WO89/02203 A1 | 3/1989 |
| WO | WO97/09822 A1 | 3/1997 |
| WO | WO97/17803 A1 | 5/1997 |

OTHER PUBLICATIONS

ORAD, INC., "Cyberset Entry Level Virtual Set", (1997).
Motion Analysis Corporation," Animation Performance Capture for Film, Video and Games Production", (1996).

* cited by examiner

Primary Examiner—Victor R. Kostak
(74) Attorney, Agent, or Firm—Christopher L. Parmelee; Walker & Jocke L.P.A.

(57) ABSTRACT

The invention relates to a method and system for creating video programs in a virtual studio, ensuring the interactive interaction of actors with objects of virtual reality, and also simplification and acceleration of the procedure of creating animated programs. During the filming of an actor 2 in a virtual studio, an image of the actor is superimposed with the image of virtual space formed at the angle of view of a virtual camera with parameters, which correspond to the parameters of the television camera 3. Wherein in order ensure interactive interaction of the actor with the objects of virtual space with the aid of a means 10, the angle of view of the actor is determined and the image of virtual space formed in the unit 8 in accordance with the angle of view of the actor is displayed to him by means of the means 11.

20 Claims, 4 Drawing Sheets

METHOD AND SYSTEM FOR CREATING VIDEO PROGRAMS WITH INTERACTION OF AN ACTOR WITH OBJECTS OF A VIRTUAL SPACE AND THE OBJECTS TO ONE ANOTHER

FIELD OF THE INVENTION

The present invention relates to television, including interactive television, animation, user telecommunications networks, and in particular to a method and system for creating video programs in a virtual studio, including game and animation programs with interactive interaction between the actors and objects of virtual reality.

BACKGROUND ART

Being a new technology, virtual studios gave birth to new terms and concepts.

A virtual studio—this is a new technology of filming people on a background of virtual decorations which are formed with the aid of computers. A virtual studio, as distinctive from conventional studios, is based on the use of images created by a computer. The elements of a virtual studio are in the memory of a computer in the form of models of virtual space. A virtual studio may be used for live, real time transmission conditions and for filming with subsequent processing. The whole complex of equipment for realization of this possibility or the virtual space itself in which a human is immersed is often called a virtual studio.

A blue room (chromakey room, blue box) is a usual television studio, all the walls and floor of which are painted with a uniform blue color. All filming of a user (actor, host) made with television cameras is made in this studio. The filming therein is made with several cameras, the cameras being used in turn, changing the point from which the shots are made. The image is sent to a computer. In the computer the image of the user is separated from the blue background and is superimposed with the decorations of the modeled virtual space at the angle of view of the virtual cameras (method of rear projection). In order to coordinate the actions of the host, certain marks may be made on the floor of the blue room with the arrangement of auxiliary objects: cubes, posts, etc. Such steps will help the host to at least approximately assess the geometry of the virtual space.

Virtual Set—this is an analogue of a three-dimensional stage in classical packets for computer graphics, comprising information on all virtual decorations, their animation and conversion in time, sounds, the number of virtual cameras, the set of textures and the live sources of the video image.

Virtual camera—this is a camera in the virtual set, which is provided with the parameters of a television camera in a real studio. These parameters are supplied by sensors secured on the lens of a camera and determine the position, orientation and focus of the camera. As a result of this, the perspective at which a person is seen in the television camera will coincide with the perspective of the decorations for the virtual camera.

A ruler of a camera-computer—this is a part of the virtual studio complex, which includes a video camera with sensors, a computer with a unit containing the necessary software, and a unit aligning the image of an actor, being filmed in a chromakey room, with the virtual decorations. This autonomous chain makes it possible for an operator to constantly view an actor in the virtual set. The presence of several such chains makes it possible to mix the plans from different virtual cameras.

A method of filming television programs with the use of a virtual studio is known, wherein sensors, mounted on all of the video cameras, continuously transmit information on the position of each of the video cameras in space, the direction and focal distance of the lens. The obtained data are fed to the computer into the virtual space image calculation unit at the angle of view of the virtual camera (see Cyberset O, High-end Virtual Set, catalogue of the ORAD Inc. firm, 1997).

In the blue room of the virtual studio in which the actor is being filmed, he can only imitate interaction with objects of the virtual space. And only the operator sees the actor and virtual space together. The actor should remember the approximate positioning of the objects in virtual space, and during the filming he may only imitate interaction with the virtual objects. He may rehearse his movements and interaction with the objects of virtual reality beforehand in order to achieve the necessary matching during the filming.

A drawback of the known method is that real interaction with the objects of virtual space does not take place, since the actor himself does not see these objects. Interactive interaction of the objects of virtual space with the actor cannot be carried out either, since in the computer in which virtual space is modeled, there is no information on the actions of a live actor, on his position and orientation. The user (actor) may move only within the limits of the chromakey room. Without additional accessories he cannot imitate free movement over large distances, for example, along the corridors of infinite labyrinths.

A method of creating animated films is also known, wherein information on the movements of live beings, in particular, a human is used (see Motion Analysis, Animation Performance Capture for Film, Video and Games Production, catalogue of the Motion Analysis Corporation, 1996). Data on position and orientation are taken dynamically from a moving person with the aid of a system of sensors. These data are collected into a library of movements and are used in the animation of an image created by an artist. With modem powerful computers, such animation may be obtained in a real time condition. A person moving in an appropriate manner may observe on the screen of a computer that his computer image exactly repeats his real movements, and if there are special sensors, the mimics of the person. Then, with the aid of an editing program the episodes earlier created in this manner are combined with the episodes of animated cartoons into one whole. This is a lengthy and laborious procedure.

DISCLOSURE OF THE INVENTION

The object of the present invention is to create a method and system for creating video programs, in particular television and animated cartoon programs, which do not have the drawbacks indicated above. The technical result thereby achieved is the provision of interactive interaction of an actor with objects of virtual space and the natural movement of the actor in virtual space for any distances, in any direction, and also simplification and acceleration of the procedure of creating animation programs which could in the ideal case go on the air in real time condition, simultaneously with their moment of creation.

This result is achieved in that in a method for creating video programs, during the filming of a television program, wherein virtual space is modeled in which an actor should be displayed, the actor is filmed in a chromakey room of a studio, current parameters of a television camera are determined, an image of virtual space is formed at an angle of view of a virtual camera with parameters of a real television camera, an image of the actor is superimposed with the formed image of virtual space, in accordance with the invention, an angle of view of the actor is determined, an image of virtual space is formed which corresponds to the angle of view of the actor, and the formed image of virtual space is displayed to the actor.

Wherein it is preferable that interaction of the actor with objects of virtual space be carried out with the aid of a manipulator with six degrees of freedom, the position and orientation of the actor be tracked and the obtained data be used to make changes in the displayed virtual space, wherein during the filming the actor is provided with the possibility of imitating movement for any distances in any direction.

Furthermore, the filming of the actor and display to him of virtual space are carried out on the basis of the stroboscopic effect, wherein the filming and display of virtual space to the actor alternate with a predetermined frequency.

Furthermore, an image of the actor, filmed by a real camera, the parameters of the camera and data on changes in virtual space are preferably transmitted through a telecommunications network to a user device, where an image of virtual space is formed at the angle of view of the virtual camera with parameters of a real camera and the image of the actor received by the user device is superimposed with the formed image of virtual space, wherein the input of control commands, transmitted over the telecommunications network into the studio for corresponding change of virtual space, is carried out in the user device.

The indicated technical result is also achieved in that a system for creating video programs, mainly filming of television programs, comprising a chromakey room, television cameras provided with sensors of the parameters, a virtual space model unit, a unit forming an image of virtual space at an angle of view of a television camera connected thereto and an image superimposition unit, wherein outputs of the sensors of the parameters of a television camera are connected to a corresponding input of the unit forming an image of virtual space at the angle of view of the television camera, an output of the television camera is connected to a first input of the image superimposition unit, second and third inputs of which are connected respectively to an output of an alpha-mask and to a background output of the unit forming an image of virtual space at the angle of view of the television camera, and an output of the image superimposition unit is an output for the formed image signal, in accordance with the invention comprises a means for determining the angle of view of the actor, a unit forming an image of virtual space at the angle of view of the actor, which is coupled by two-way communication with the virtual space model unit, and a means for displaying virtual space to the actor, preferably made in the form of a virtual head-piece, wherein an output of the means for determining the angle of view of the actor is connected to a corresponding input of the unit forming virtual space at the angle of view of the actor, an output of which is connected to an input of the means for displaying virtual space to the actor.

Wherein it is preferable that it comprise a means for interactive interaction of an actor and objects of virtual space, and a means for determining the position and orientation of the actor, which are coupled to the virtual space model unit.

Furthermore, the system preferably comprises a channel of a telecommunications network, a connection unit coupled to the channel of the telecommunications network and to the virtual space model unit, and, at least, one user device comprising a user processor device coupled to the channel of the telecommunications network, a user unit for forming virtual space at the angle of view of the television camera, a user unit for superimposing the images, and a unit displaying the superimposed image, wherein a first output of the user processor device is connected to an input of the user unit for forming virtual space, a second output of the user processor device is connected to a first input of the user unit for superimposing the images, second and third inputs of which are connected to corresponding outputs of the user unit for forming virtual space, and an output is connected to an input of the unit displaying the superimposed image.

Wherein the system preferably also comprises a user control unit, an output of which is connected to a corresponding input of the user processor device, and a unit processing control commands of users, which is connected by two-way communication to the connection unit and the virtual space model unit.

The indicated technical result is achieved in that in a method for creating video programs, mainly animation programs, wherein a virtual space model is formed, data on the position and orientation of the actor are registered in dynamic conditions, objects of the virtual space are animated with the use of registered data on the position and orientation of the actor, in accordance with the invention, during registration of data on the position and orientation of the actor, the angle of view of the actor is determined, virtual space is formed and displayed at that angle of view, and registration of data on the position and orientation of the actor is carried out during his interaction with objects of virtual space.

Wherein, the actor is preferably arranged on a means for imitating movement for any distance in any direction.

Furthermore, data on changes in virtual space, including data being registered on the position and orientation of the actor and interaction with objects of the virtual space, are preferably transmitted through the telecommunications network to the user device to form an image of virtual space with animated objects and display them to the user, wherein the angle of view for forming an image of virtual space is preferably chosen by the user.

The indicated technical result is also achieved in that a system for creating video programs, mainly animated films, comprising an animation studio including a virtual space model unit, coupled thereto unit for forming an image of virtual space, a means for determining the position and orientation of the actor which is coupled to the virtual space model unit, in accordance with the invention comprises a means for determining the angle of view of the actor, a unit for forming virtual space at the angle of view of the actor, connected to the virtual space model unit, and a means for displaying virtual space to the actor, wherein an output of the means for determining the angle of view of the actor is connected to a corresponding input of the unit forming virtual space at the angle of view of the actor, an output of which is connected to an input of the means for displaying virtual space to the actor.

Wherein the system additionally comprises a channel of a telecommunications network, a connection unit coupled to the channel of the telecommunications network and to the virtual space model unit, and a user device comprising a user processor device coupled to the channel of the telecommunications network, a user unit for forming virtual space and a display unit, wherein an input of the user unit for forming virtual space is connected to an output of the user processor device, and its output—to an input of the display unit.

Furthermore, the animation studio preferably also comprises a unit for processing control commands of the users, which is coupled to the connection unit and to the virtual space model unit, and the user device comprises a control unit, a first output of which is connected to an input of the user processing device, and a second output—to a first input of the user unit for forming virtual space.

BRIEF DESCRIPTION OF THE DRAWINGS

The invention is described by examples of its embodiment, illustrated by drawings.

METHODS OF CARRYING OUT THE INVENTION

Figure 1:
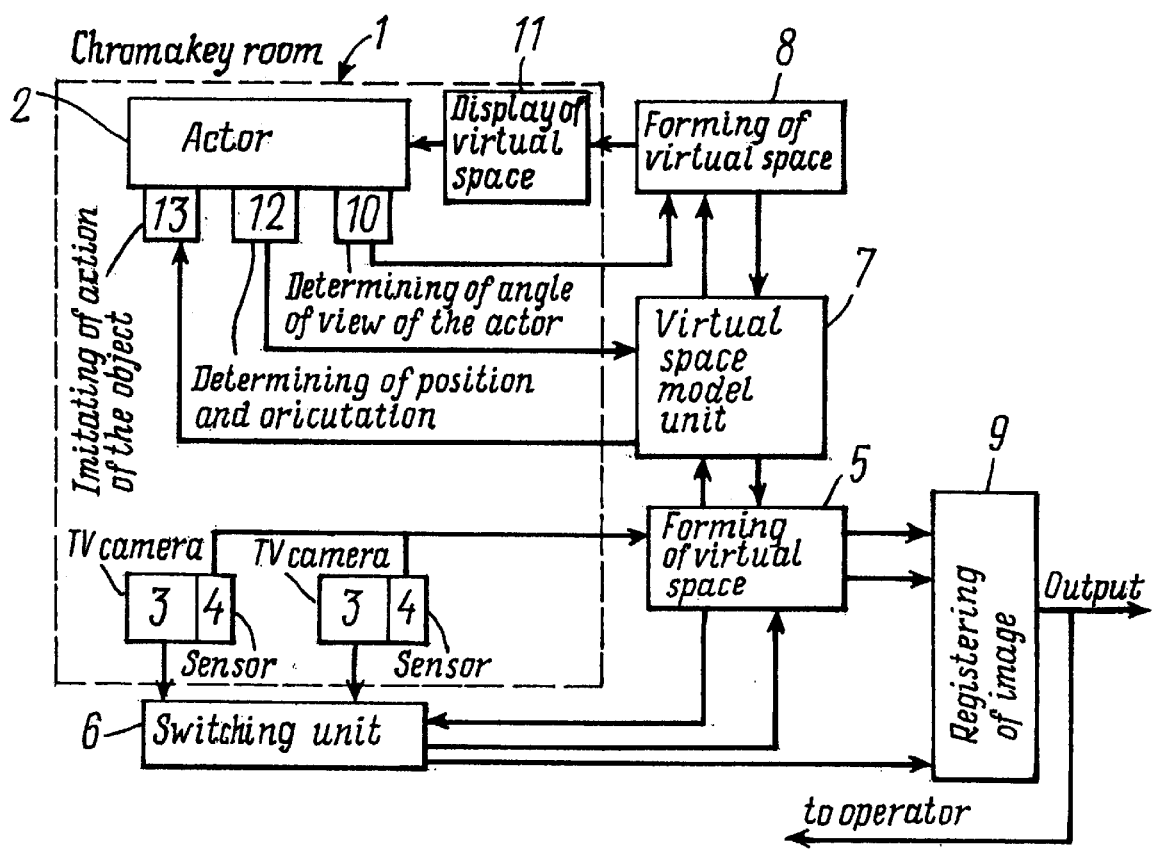
FIG. 1 shows a block diagram of a system for creating television programs, according to the invention.

A system for creating television programs, shown in FIG. 1, comprises a chromakey room 1 serving to film an actor 2, at least one television camera 3, on which sensors 4 are arranged. Outputs of the sensors 4 are connected to a unit 5 for forming an image of virtual space at the angle of view of the camera 3. Outputs of the television cameras 3 are connected to inputs of a unit 6 for switching the television cameras. The switching unit 6 is connected by two-way communication to the unit 5 for forming an image. The system also comprises a virtual space model unit 7, connected by two-way communications with the unit 5 for forming an image of virtual space at the angle of view of the television cameras and to a unit 8 for forming an image of virtual space at the angle of view of the actor. The virtual space model unit 7 in essence is a computer with corresponding software. Outputs of the unit 5 and the unit 6 are connected to corresponding inputs of a unit 9 for registering an image, which has an output of a finally fonder video signal, directed also from a corresponding television camera 3. The actor 2 is provided with a means 10 for determining the angle of view of the actor, a means 11 for displaying virtual space at the angle of view of the actor, a means 12 for determining the position and orientation of the actor and a means 13 for imitating the action of the objects of virtual space on the actor. A user may use sensors, which are arranged on the head of the actor, as the means 10 for determining the angle of view of the user. These sensors should determine the coordinates of the head of the actor in space and the vector of direction of the face of the actor (angle of view of the actor in space). It is advisable to use a virtual headpiece, which makes it possible to display a separate image for each eye and to see virtual space as three-dimensional, as the means 11 for displaying virtual space at the angle of view of the actor. The system according to application Ser. No. 96116414 of Aug. 14, 1996, the same Applicant, in respect of which a positive decision has been taken to grant a patent of the Russian Federation, may be used as the means 12 for determining the position and orientation of the user in space. An output of the means 10 for determining the angle of view of the actor is connected to an input of the unit 8 for forming an image at the angle of view of the actor. An input of the means 11 for displaying virtual space at the angle of view of the actor is connected to an output of the unit 8 for forming virtual space at the angle of view of the actor. An output of the means 12 for determining the position and orientation of the actor is connected to a corresponding input of the virtual space model unit 7, an additional output of which is connected to an input of a unit 13 for imitating the action of objects of virtual space on the actor.

Figure 2:
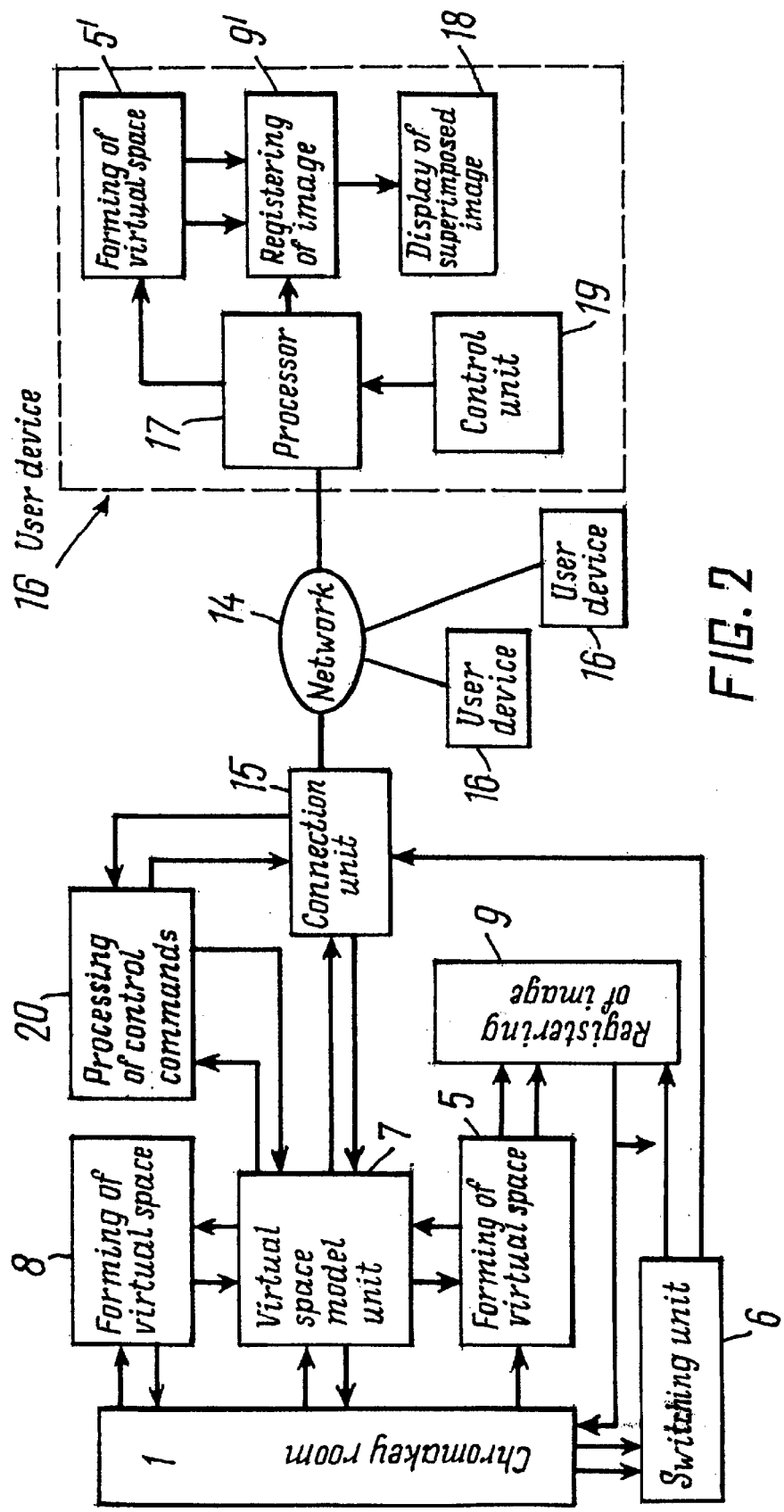
FIG. 2 shows a block diagram of a system for creating television programs, according to the invention, ensuring transmission of a video image of an actor, the parameters of a television camera through telecommunications networks, generation of virtual decorations and their registration with the video image of the actor on a computer of a user.

The system for creating television programs which is shown in FIG. 2 ensures the transmission of video programs, created in a virtual studio, through telecommunications networks and the interactive interaction of user-viewers with objects of virtual space. In the system in FIG. 2, an output of the switching unit 6 of the television cameras is coupled to telecommunications network 14 via a corresponding connection unit 15 (for example, a modem). The telecommunications network 14 is connected to a user device 16 by means of a processor device 17, outputs of which are connected respectively to an input of a unit 5' for forming virtual space at the angle of view of the television camera and to an input of unit 9' for registering the images. Outputs of the unit 5' are connected to inputs of the unit 9' for registering the images, an output of which is connected to an input of a unit 18 for displaying a superimposed image. The user device 16 also comprises a control unit 19 connected to an input of the processor device 17 for transmitting user control commands via the telecommunications network 14 and the connection unit 15.

In the variant of the system presented in FIG. 2, the system additionally comprises a unit 20 for processing control commands of a user, which is coupled by two-way communication to the connection unit 15 and the virtual space model unit 7. The control commands of users may be used to obtain the following information: user rating, distribution of the opinion of groups of users, their preferences, an individual evaluation of users actions. In accordance with the information on the users, individual special information, tasks, advertisements, evaluation, suggestions may be sent to the user devices. Such individual information may be displayed in special windows on the background of a common image.

In the variant shown in FIG. 2, the system elements designated by reference numerals 1, 5–9, 20 relate to the virtual studio.

Figure 3:
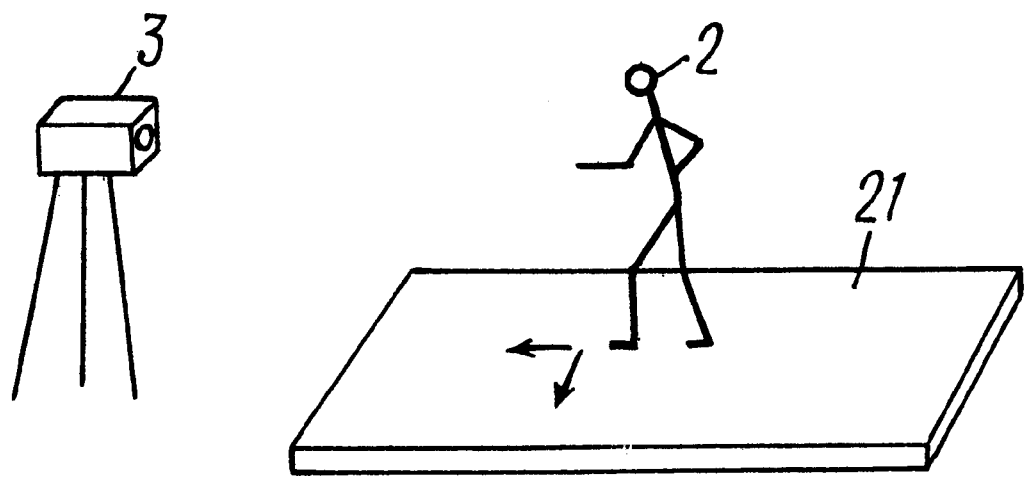
FIGS. 3, 4 show variants of devices providing an actor with the possibility of imitating walking over large distances to any side.

A variant of the device is shown in FIG. 3, which is a platform 21 on which the actor 2 may be positioned (see application Ser. No. 96109689 of May 6, 1996, the same applicant, in respect to which a positive decision has been issued to grant a patent of the Russian Federation).

Figure 4:
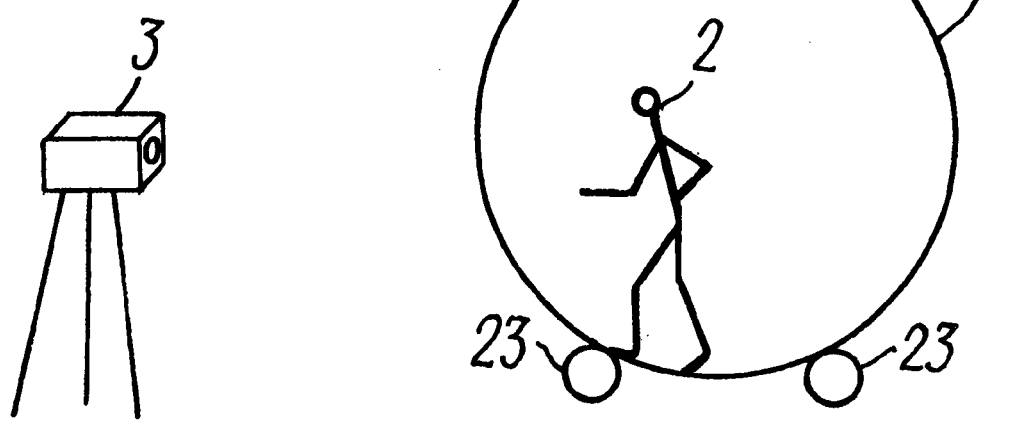

A variant of the device is shown in FIG. 4, which is a transparent sphere 22, which may be used for the positioning therein of an actor 2. The sphere 22 is adapted to rotate about its center on movable supports 23 (see application Ser. No. 95113085 of Jul. 14, 1995, the same applicant, in respect to which a decision has been issued to grant a patent of the Russian Federation).

Figure 5:
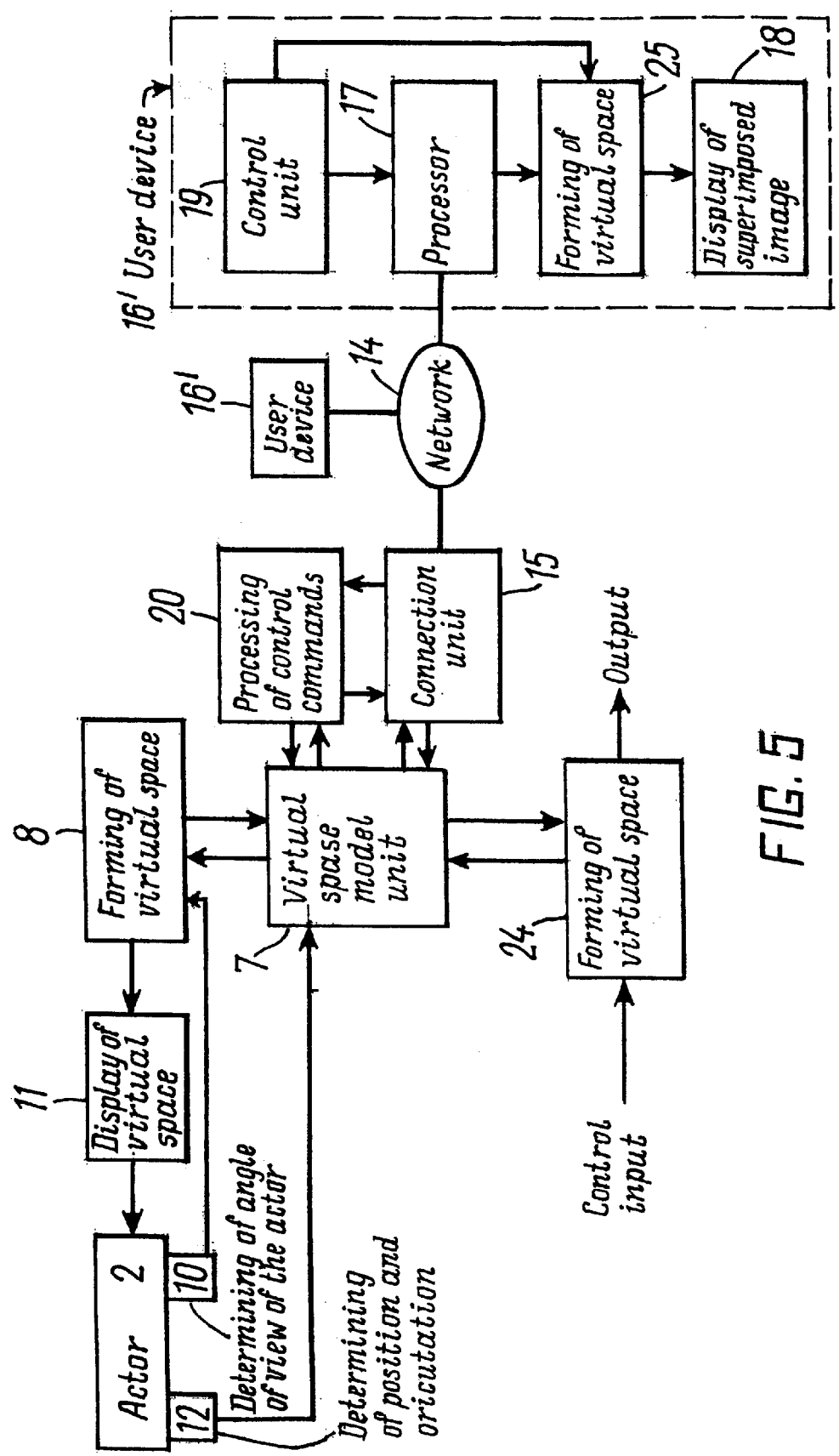
FIG. 5 shows a block diagram of a system for creating animation programs, according to the invention.

The system for creating animation programs, shown in FIG. 5, comprises a means 10 for determining the angle of view of the actor 2, a means 11 for displaying virtual space at the angle of view of the actor, a means 12 for determining the position and orientation of the actor. An output of the means 10 for determining the angle of view of the actor is connected to an input of the unit 8 for forming images at the angle of view of the actor. An input of the means 11 for displaying virtual space to the actor at the angle of view of the actor is connected to an output of the unit 8 for forming virtual space at the angle of, view of the actor. An output of the means 12 for determining the position and orientation of the actor is connected to a corresponding input of the virtual space model unit 7. The virtual space model unit 7 is connected by two-way communication to the unit 8 for forming virtual space at the angle of view of the actor and to unit 24 for forming virtual space at an angle of view, selected by the director with the use of a corresponding control input. The unit 24 has an output of the formed image of virtual space, which is a finished animated film.

In order to use the possibilities of transmitting animation programs via telecommunications networks and ensuring interactive interaction of users with objects of virtual space, the virtual space model unit 7 is coupled to the telecommunications network 14 via a corresponding connection unit 15. The telecommunications network 14 is connected to the user device 16' via the processor device 17, the output of which is connected to an input of a unit 25 for forming virtual space at the angle of view selected by the user with the aid of unit 19, an output of which is connected to an input of the unit 25, or, if this is not selected by the user, at an angle of view selected by a director in the studio. An output of the unit 25 is connected to an input of the unit 18 for displaying the virtual space image. The control unit 19, connected to an input of the processor device 17, may also be used for the transmission of user control commands through the telecommunications network 14, connection unit 15, unit 20 for processing user control commands, to the virtual space model unit 7. In the system according to FIG. 5, the elements designated by reference numerals 7, 8, 10–12, 20, 24 relate to the animation studio.

The system for creating television programs, realized in accordance with the invention, operates in the following manner.

An actor 2 is positioned in the chromakey room 1 (FIG. 1). The chromakey room provides a decoration with a predetermined single-color background. At least one television camera 3 films the actor 2 on the background of such a chromakey decoration. Signals from television cameras 3 are fed through the unit 6 for switching the television camera (at the choice of the director) to the unit 9 for registering the image. Wherein, the position, orientation, focus of the television camera are determined with the aid of the sensors 4, coupled to a corresponding camera 3. Usually a set of special sensors, connected to the lens of a television camera, is used for these purposes. The position, orientation, focus of the television camera may be determined by software with the use of a program for understanding the images being fed from the television camera. The position of a user in the studio may be determined in the same manner. The measured data of the necessary parameters of the television cameras are fed into the unit 5 for forming an image of virtual space at the angle of view of the television camera, on the basis of data of the virtual space model unit 7. With the aid of the virtual space model, an image of the virtual space is formed in unit 5 in accordance with current parameters of the television camera 3, measured by sensors 4 (i.e. data, on the basis of which a virtual camera is modeled). The formed image of virtual space, i.e. an image of the background virtual space and images of virtual objects, overlapping the user image for the camera (so-called alpha-mask), from the output of the unit 5 is transmitted to unit 9 for image registration, where the image of the actor, filmed with a real television camera 3, is superimposed with the image of virtual space formed by the unit 5. Actually, in the unit 9 the chromakey background is cut from the image received from the unit 6, and the obtained image of the actor is superimposed on the background image formed in the unit 5, and the alpha-mask, also formed in the unit 5, is overlaid on top of the obtained image. Taking into account that the parameters of the virtual camera and the real television camera are identical, the obtained image of the user on a background of virtual space is realistic. The image obtained in the unit 9 may be transmitted to the final users (viewers) for display on user devices, recording into a memory, or for other uses. The obtained image from the unit 9 is also transmitted to a corresponding television camera 3 for display to the operator.

In order for the actor to see the same virtual space, on the background of which he is displayed, and to interactively interact with objects of the virtual space, the virtual space is also displayed to him, but at the angle of view of the actor himself. The means 10 for determining the angle of view of the actor is used for this. . Information on the angle of view of the user is transmitted to the unit 8 for forming virtual space at the angle of view of the actor. In unit 8, connected to the virtual space model unit 7, an image is formed in accordance with that same model of virtual space as in unit 5, but at the angle of view of the actor. The image formed in the unit 8 is displayed to the actor with the aid of display means 11. Virtual headpieces or virtual glasses, capable of displaying three-dimensional images (stereo image), may be used as the display means 11. The image supplied to the means 11 is only seen by the actor, and it may differ in respect to quality from the image supplied from unit 5 to unit 9, and comprise an image of several auxiliary parts necessary for the filming. This may be prompting for the actor, special marks, an image of the television cameras, devices and limitations in the studio (for example, in order for an actor with a headpiece on his head to know the current positioning of the devices in the studio, of the type shown in FIG. 3). Thus, the actor is immersed in virtual space, on the background of which he is in the end filmed. This means that he can exactly and adequately act in accordance with the conditions in the surrounding virtual space in which there may be objects acting in an according manner. Wherein, the objects of virtual space may be controlled by the user in a real time mode. Virtual space may be displayed to the actor by many methods, for example, be projected on the walls of a virtual studio. So that such an image in the studio would not be in the frame, it is shown alternately with the film. It is projected on the walls of the studio for a fraction of a second, then the image is turned off and filming is conducted for the next fraction, then the cycle is repeated. If such a periodicity will alternate for not less than 25 times per second, the actor will see a continuous image, due to the stroboscopic effect, and the camera will shoot on a clean chromakey background.

The actor 2 may be additionally provided with a means 12 for determining the position and orientation of the actor in virtual space, making it possible for the actor to interactively interact with objects in virtual space. In the simplest case, a three-dimensional manipulator or virtual glove may be used as the means 12. A preferable variant of the means 12 will be a system of sensors determining the position and orientation of the main parts of the body of an actor, the so-called virtual suit (see application Ser. No. 96116414 of Aug. 14, 1996, indicated above). Signals ensuring interactive interaction of the actor with the objects of virtual space are supplied from the output of the means 12 to the virtual space model unit 7. That is, in accordance with the actions of the user, virtual space will change, for example, objects will begin to move, coming together or, to the contrary, flying apart. Of course, these changes will be displayed in both units 5 and 8. Then the actor sees the result of his actions, and the user-viewer, receiving information from the unit 9, also sees the action of the user and the response thereto by the objects of virtual space. The actor can also change his behavior and actions in accordance with the behavior of objects in the virtual space. As a result interactive interaction of the actor with objects of virtual reality is ensured. Control of some of the objects of the virtual space may be carried out by users in real time conditions and not by a computer program. The filming of two or more interacting actors may be carried out in the studio. In order to realize physical action on the actor, a so-called suit may be used, the suit being provided with feedback means and connected to the unit 7, or several external objects, ensuring the possibility of acting on the actor, may be used. For example, the perception of a blow of a virtual object by an actor may be ensured by action on him from the unit 13. A corresponding feedback may be realized with the aid of a piezoelectric irritant or a low-frequency loudspeaker. Clothes may also be used which ensure liquid or air pressure on corresponding portions of the body at the necessary moment of time.

At present the majority of users do not have wide-band access to Internet type networks and cannot obtain full-size video images. The image obtained in the virtual studio consists of two parts: the video image itself of the user, filmed by a television camera, and the background image of virtual space generated by a computer. In modem virtual studios these two images are combined and transmitted to a user as one whole along traditional television broadcasting channels. Such an image in a stream mode, even compressed, cannot be transmitted to the majority of users connected to telecommunications networks with the aid of narrow-band channels. However, where a user device is made in the form of a computer capable of generating a graph, the functions of units 5, 9 and 7 may be completely or partially duplicated on computers of users (viewers). Then information on the actions of an actor, current parameters of virtual space, parameters of a virtual camera will be transmitted from the virtual space model unit 7 through an interface unit 15 and telecommunications network 14 to a user device 16 (FIG. 2). The received information through the processor device 17 is fed to the unit 5' for forming virtual space at the angle of view of the television camera 3. Similarly, a compressed image from the television camera is fed into unit 9' from unit 6 through units 15, 41, 17, for example, in a MPEG-2 format, for superposition of the images. The unit 5' of the user device will form an image of virtual space at the angle of view of the television camera 3 and transmit it to unit 9' for superimposing images of the user device. The unit 9' will superimpose the image of the user, filmed in the blue room of the studio, obtained over a network and decoded, for example by a MPEG-2 decoder, and the image of virtual space obtained from the unit 5'. The superimposed image formed in the unit 9' is displayed to the user with the aid of the display unit 18.

The user with the aid of the control unit 19 may transmit control commands through the telecommunications network into the studio to the unit 20 for processing control commands of users. Information is transmitted from the output of the processing unit 20 to the virtual space model unit 7. The information obtained from the user may be information on bets, on votes by users in respect to a selection of a further variant of a plot or solution of a hero's fate, it may be displayed on a virtual panel and be presented to an actor. This may be control commands for a concrete object of the virtual space or a virtual sparring partner for the actor. For control of objects of virtual space, a computer program or director may connect any user in a random manner or in accordance with tests or a rating of his control commands. Any user may be connected for a voice dialogue with an actor or with other users, including in a teleconference mode. The unit 20 for processing control commands of users plays an important role in realizing interactive interaction between the users and the objects of virtual space. As a result of processing control commands of users and all of the information about them, an individual remark will be formed and displayed for each user or group of users. Such individual information may be displayed in special windows on a background which is common for all of the images. Information from separate users may be fed in the form of video images into the studio in the video conference mode, which would make it possible to take an interview with users in a real time mode.

The volume of the information supplied from the unit 6 may be reduced with the use of clothes of the chromakey color, put on the actor, at the same time expanding the possibilities of the filming. Then an image of, for example, a head, wrists, an object in hands will be transmitted as a video image from unit 6. Wherein, the body of the actor, or more exactly its image, will be animated in accordance with the data from unit 12 for determining the position and orientation of a user. A three-dimensional image of an actor, animated in accordance with his actions, may be preliminarily created by an artist and should not necessarily coincide with the real image of the actor.

FIG. 3 shows a variant of the device, which is a platform 21, the belt of which serves for placement of an actor 2 thereon. The platform is built in such a manner that its surface is capable of moving horizontally in a direction reverse to the direction of movement of an actor on it. The actor may move to any side by any distance, and the platform will compensate his movements, moving the belt in such a manner that the actor will remain all the time on the surface of the platform. If the actor takes several steps in some direction, the surface of the belt will move by that same distance, but in the reverse direction. Wherein, the actor will remain in the same real space, although in virtual space he will have moved. This is convenient for operators, filming an actor who has the possibility of moving along the labyrinths of virtual space, but all the time remaining in front of the lenses of the television camera on a background of chromakey decorations. It is only necessary to take into account the compensating displacement of the platform in order to redefine the position of the virtual cameras in virtual space. FIG. 4 shows a variant of the device which is a transparent sphere 22 mounted in a chromakey room and capable of rotating about its own center on movable supports 23 to provide an actor who is inside the sphere with the possibility of imitating walking over large distances to any side. If the actor takes steps along the inner surface of the sphere, the sphere under the action of the force of gravity of the actor will turn in the direction reverse to the movement of the actor. Wherein the actor will remain all the time in the lower part of the sphere at the point of stable equilibrium.

The system for creating animation programs which is made in accordance with the invention and is shown in FIG. 5, operates in the following manner.

In the studio the actor is provided with the means 10 for determining the angle of view for displaying a virtual space to him at the angle of view of the actor with the aid of the means 11. Wherein the position and orientation of the actor is determined by the means 12. Information from the output of the means 12 for determining the position and orientation of the actor is applied to an input of the virtual space model unit 7. In the unit 7, connected to units 8 and 24, the current state of the virtual space model is calculated in accordance with all of the information applied. In unit 8, virtual space is formed at the angle of view of the actor and is displayed to the actor with the aid of the means 11. In unit 24 virtual space is formed at an angle of view (camera angle) selected by the director. From a corresponding output of the unit 24, the formed image of virtual space, which is a finished animated film, in which the actor interacts with objects of virtual space and/or with other actors, may be seen on display means, be recorded in a memory, be used for further editing, proceed in the form of a television signal for visualization on display means of the final users (viewers). Taking into account that the actor may be visualized in virtual space in various images, scenes in which a plurality of characters interact may be created with the aid of just one actor. In order to do this in one and the same scene of virtual space, an actor acts at first for one of the characters and the scene is filmed, then this scene is successively run once more, and the actor acts in this scene as another character. Thus, for several recording cycles the scene is filled with all of the necessary characters. In the preferable variant actors, who may even be in different cities, are each immersed in its own image in one virtual space and interact therewith. Then the scene of interaction will take place in a real time mode and more naturally.

In order to use the possibilities for transmitting animation programs via telecommunications networks and to ensure interactive interaction of users with objects of virtual space, the virtual space model unit 7 is connected via the corresponding connection unit 15 and the telecommunications network 14 to the user device 16'. Virtual space at the angle of view selected by the user with the aid of unit 19 is formed in the unit 25, the output of the unit 19 is connected to an input of the unit 25, or if such selection is not made, at an angle of view selected by the director in the studio. The signal from the output of unit 25 is applied to unit 18 for displaying the virtual space image to the user. Corresponding control commands are applied from the unit 19 through the processor device 17, telecommunications network 14, connection unit 15 to the unit 20 for processing control commands of the users and then to the virtual space model unit 7. The commands processed in the unit 20 are used to ensure interactive interaction of the users with the objects of virtual space.

Industrial Applicability

By using the methods described above, it is possible to film for one pass in a real time mode scenes in which interactive interaction of an actor and objects of virtual space takes place. Such a method makes it possible to reduce costs, simplify and enhance the creation of scenes of interaction of the actor and virtual objects, removing the laborious operations of editing and combining earlier animated characters in one scene. This will take place in the same manner as with filming game films when a whole episode is filmed right away. Since users, from whom information on their movements will be taken, are already immersed in virtual reality, their movements will correspond to real actions with objects of the virtual space, and not to imitations thereof. Directors have the additional possibilities of controlling the objects of virtual space. It will be possible to change the dimensions of the objects relative to one another and relative to the user, and also to set the scale of dynamics, the time characteristics for behavior of the objects.

When immersed in virtual space, an actor may interact not only with objects controlled by the computer program or other actors, but also with objects controlled by other users (viewers).

The most preferable variant of realization of the present invention is use of a standard set of a virtual studio with the addition of a unit displaying virtual space to the user and a device for carrying out interactive interaction between the user and objects of virtual reality.

It should be noted that the concept "video programs," used in the instant specification, should be understood in a broader manner than programs for standard television broadcasting. Video programs created by the method corresponding to the present invention may be put in computer networks and transmitted through the computer networks, also providing interactive interaction with a "viewer." The claimed method may be used to film movies and animated films. The proposed technologies may be a base for translation, for example via Internet, of fights between boxers, karate fighters among themselves or with virtual partners. With the aid of the proposed technology it is possible to film an actor, acting in a labyrinth of popular computer games. The claimed method may serve as a base for creating different new forms of video programs, interactive serials.

What is claimed is:

1. A method for creating video programs, with interaction of an actor with objects of a virtual space and the objects to one another, comprising:

modeling the virtual space in which an actor should be displayed, creating a chromakey room of a studio for filming an actor, filming the actor with at least one television camera in the chromakey room of the studio, determining current parameters, including an angle of view, of said at least one television camera, forming an image of the modeled virtual space said angle of view of the television camera with determined parameters of the television camera, determining an angle of view of the actor, forming an image of the modeled virtual space at said angle of view of the actor, displaying the formed image of the virtual space to the actor, and superimposing an image of the actor, with the exception of a chromakey background, with the image of the virtual space formed at said angle of view of the television camera.

2. The method according to claim 1, further comprising interaction of the actor with objects of the virtual space, using a manipulator with six degrees of freedom.

3. The method according to claim 1, further comprising tracking a position and orientation of the actor and using obtained data to make changes in the displayed virtual space.

4. The method according to claim 1, further comprising providing to the actor during the filming a possibility to imitate movement for any distances in any direction.

5. The method according to claim 1, wherein said steps of filming the actor and displaying the virtual space to the actor are carried out on the basis of the stroboscopic effect, wherein said steps of filming and displaying the virtual space to the actor alternate at a predetermined frequency.

6. The method according to claim 1, further comprising:

transmitting the image of the actor, filmed by the television camera, the parameters of the camera and the data on changes in the virtual space through a telecommunications network to a user device, forming an image of the virtual space in the user device at said angle of view of the television camera, and superimposing the image of the actor received by the user device with the formed image of the virtual space.

7. The method according to claim 6, further comprising:

inputting control commands in the user device, transmitting said control commands over the telecommunications network into the studio, and using received control commands in the studio in forming the image of the virtual space.

8. A system for creating video programs, with interaction of an actor with objects of a virtual space and the objects to one another, comprising:

a chromakey room a studio, at least one television camera in said chromakey room for filming an actor to provide an image of the actor, said television camera being provided with sensors for determining parameters including an angle of view of the television camera, a means for modeling the virtual space, means for forming an image of the virtual space at said angle of view of the television camera, connected to said means for modeling the virtual space, means for determining an angle of view of the actor, means for forming an image of the virtual space at the angle of view of the actor, connected to said means for modeling the virtual space, means for displaying the formed image of virtual space to the actor, and a means for superimposing the image of the actor with the image of the virtual space at the angle of view of the television camera, wherein said sensors of the parameters of said television camera are connected to an input for supplying the parameters of the televisions camera of said means for forming the image of the virtual space at the angle of view of the television camera, a said means for determining the angle of view of the actor is connected to said means for forming the image of the virtual space at the angle of view of the actor, first, second and third inputs of said means for superimposition are connected respectively to an output of the television camera, to an output of an alpha-mask and to a background output of said means for forming an image of virtual space at the angle of view of the television camera, and an output of said means for superimposition is an output for a formed image signal.

9. The system according to claim 8, wherein said means for displaying virtual space to the actor is made in the form of a virtual head-piece.

10. The system according to claim 8, further comprising means for interaction of actor and objects of virtual space, said means for interaction being coupled to said means for modeling the virtual.

11. The system according to claim 8, further comprising means for determining a position and orientation of the actor, said means for interaction being coupled to said means for modeling the virtual space.

12. The system according to claim 8, further comprising:

a channel of a telecommunications network, means for connection coupled to the channel of the telecommunications network and to said means for modeling the virtual space, at least one user device comprising:

a user processor device coupled to the channel of the telecommunications network, user means for forming a virtual space at the angle of view of the television camera, coupled to said user processor device, user means for superimposing images, and displaying a superimposed image, coupled to said user processor device and said user means for forming virtual space.

13. The system according to claim 12, wherein said user device further comprises control means for input control commands of the user, said control means being connected to said user processor device, and said studio further comprises means for processing control commands of users, connected to said means for connection and said means for modeling the virtual space.

14. A method for creating animation programs, with displaying interaction of objects of a virtual space, comprising:

forming a virtual space model, registering data on a position and orientation of the actor in dynamic conditions, animating objects of the virtual space with the use of the registered data on the position and orientation of the actor, determining an angle of view of the actor during registration of the data on the position and orientation of the actor, forming and displaying virtual space at the angle of view of the actor, wherein the registration of the data on the position and orientation of the actor is carried out during the actor's interaction with the objects of the virtual space.

15. The method according to claim 14, further comprising providing means for imitating movement for any distance in any direction to accommodate the actor on said means for imitating.

16. The method according to claim 14, further comprising transmitting data on changes in the virtual space, including said data on the position and orientation of the actor and interaction with the objects of the virtual space, through a telecommunications network to at least one user device to form an image of the virtual space with animated objects and to display said image to at least one user.

17. The method according to claim 16, wherein said angle of view for forming and displaying said image of the virtual space is chosen by said user.

18. A system for creating animation programs, with displaying interaction of objects of a virtual space, comprising an animation studio including;

means for modeling the virtual space, means for registering data on a position and orientation of the actor in dynamic conditions, means for animating objects of the virtual space with the use of the registered data on the position and orientation of the actor, said means for animating being connected to said means for modeling the virtual space, means for determining an angle of view of the actor during registration of the data on the position and orientation of the actor, said means for determining being connected to said means for modeling the virtual space, means for forming virtual space, at the angle of view of the actor and displaying the formed virtual space to the actor, wherein the registration of the data on the position and orientation of the actor is carried out during the actor's interaction with the objects of the virtual space, and said means for modeling the virtual space being coupled to said means for animating, said means for registering, and said means for forming.

19. The system according to claim 18, further comprising:

a channel of a telecommunications network, means for connection coupled to the channel of the telecommunications network and to said means for modeling the virtual space, and at least one user device, comprising:

a user processor device coupled to the channel of the telecommunications network, user means for forming the virtual space, coupled to said user processor device, and a user display unit coupled to said user means for forming the virtual space.

20. The system according to claim 19, wherein said user device further comprises control means for input control commands of the user, said control means being connected to said user processor device and to said user means for forming the virtual space, and said animation studio further comprises means for processing control commands of users, connected to said means for connection and said means for modeling the virtual space.

* * * * *